United States Patent
Boland et al.

(10) Patent No.: US 10,852,621 B1
(45) Date of Patent: Dec. 1, 2020

(54) SYSTEM AND METHOD FOR GENERATING MULTIPLE SIMULTANEOUS, CO-PROPAGATING WAVELENGTHS VIA NONLINEAR WAVELENGTH CONVERSION

(71) Applicant: Raytheon Company, Waltham, MA (US)

(72) Inventors: Brian F. Boland, Redondo Beach, CA (US); Fabio Di Teodoro, Hacienda Heights, CA (US); David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/503,258

(22) Filed: Jul. 3, 2019

(51) Int. Cl.
*G02F 1/35* (2006.01)
*G02F 1/37* (2006.01)
(Continued)

(52) U.S. Cl.
CPC ....... *G02F 1/3532* (2013.01); *G02B 27/1006* (2013.01); *G02B 27/141* (2013.01); *G02B 27/283* (2013.01); *G02B 27/286* (2013.01); *G02F 1/3544* (2013.01); *G02F 1/37* (2013.01); *H01S 3/0675* (2013.01); (Continued)

(58) Field of Classification Search
CPC ........ G02F 1/3544; G02F 1/37; G02F 1/3775; G02F 1/39; G02F 1/395; G02F 1/397; G02F 2001/3548; G02F 2001/392; G02F 1/3532
See application file for complete search history.

(56) References Cited

U.S. PATENT DOCUMENTS 7,139,120 B2 * 11/2006 Sugiya ............... H04B 10/2916
  359/341.42
7,218,440 B2 * 5/2007 Green ................... H01S 3/0675
  359/326

(Continued)

FOREIGN PATENT DOCUMENTS

DE         10114146 A1 * 10/2002 ............. G02B 27/14
EP         1471612 A1    10/2004
(Continued)

OTHER PUBLICATIONS

Houe, M and Peter David Townsend. "An introduction to methods of periodic poling for second-harmonic generation." Journal of Applied Physics. vol. 28, pp. 1747-1763. (1995). (Year: 1995).*

(Continued)

*Primary Examiner* — Rhonda S Peace (57) ABSTRACT

A system includes a waveform generator configured to generate a pulsed laser beam at a first wavelength. The system also includes at least one splitter configured to split the laser beam into multiple beams at the first wavelength. The system also includes at least one wavelength shifter configured to shift at least one of the multiple beams to another wavelength. The system also includes at least one combiner configured to combine the multiple beams into a multi-wavelength beam in which multiple wavelengths are co-aligned and propagating parallel to each other. The system also includes at least one nonlinear crystal configured to receive the multi-wavelength beam and generate multiple co-propagating beams using nonlinear wavelength conversion.

30 Claims, 4 Drawing Sheets

(51) Int. Cl.
    *G02B 27/10*     (2006.01)
    *H01S 3/30*     (2006.01)
    *G02B 27/14*     (2006.01)
    *G02B 27/28*     (2006.01)
    *H01S 3/067*     (2006.01)
    *H01S 3/11*     (2006.01)

(52) U.S. Cl.
    CPC ............ *H01S 3/06754* (2013.01); *H01S 3/11* (2013.01); *H01S 3/302* (2013.01); *G02F 2001/3548* (2013.01)

(56) References Cited

U.S. PATENT DOCUMENTS

| | | | |
|---|---|---|---|
| 8,040,929 B2* | 10/2011 | Imeshev | G02F 1/3558 |
| | | | 372/21 |
| 8,369,003 B2* | 2/2013 | Lin | G02F 1/39 |
| | | | 359/328 |
| 9,871,339 B1 | 1/2018 | Di Teodoro | |
| 2010/0220384 A1 | 9/2010 | Kimura et al. | |
| 2018/0157149 A1* | 6/2018 | Marandi | H01S 5/0092 |

FOREIGN PATENT DOCUMENTS

| | | |
|---|---|---|
| GB | 2330449 A | 4/1999 |
| WO | 2011157284 A1 | 12/2011 |

OTHER PUBLICATIONS

Akulov et al., "Fiber Lasers with a Tunable Green Output," Laser Physics, vol. 18, No. 11, 2008, 5 pages.

Belden et al., "Watt-level, gigahertz-linewidth difference-frequency generation in PPLN pumped by an nanosecond-pulse fiber laser source," Optics Letters, vol. 40, No. 6, Mar. 2015, 4 pages.

Buric et al., "Piezo-electric tunable fiber Bragg grating diode laser for chemical sensing using wavelength modulation spectroscopy," Optics Express 2178, vol. 14, No. 6, Mar. 2006, 6 pages.

Ding et al., "Theoretical and experimental research on the multi-frequency Raman converter with KGd(WO4)2 crystal," Optics Express 10120, vol. 13, No. 25, Dec. 2005, 9 pages.

Fejer et al., "Quasi-Phase-Matched Second Harmonic Generation: Tuning and Tolerances," IEEE Journal of Quantum Electronics, vol. 28, No. 11, Nov. 1992, 24 pages.

Sanchez-Rubio et al., "Wavelength Beam Combining for Power and Brightness Scaling of Laser Systems," Lincoln Laboratory Journal, vol. 20, No. 2, 2014, 15 pages.

Boyd, "Nonlinear Optics," Third Edition, Chapter 2, Academic Press, 1992, pp. 69-133.

International Search Report and Written Opinion of the International Searching Authority in connection with International Patent Application No. PCT/US2020/022393 dated Jun. 17, 2020, 12 pages.

* cited by examiner

SYSTEM AND METHOD FOR GENERATING MULTIPLE SIMULTANEOUS, CO-PROPAGATING WAVELENGTHS VIA NONLINEAR WAVELENGTH CONVERSION

TECHNICAL FIELD

This disclosure is directed in general to laser systems. More specifically, this disclosure relates to a system and method for generating multiple simultaneous, co-propagating wavelengths via nonlinear wavelength conversion.

BACKGROUND

Second harmonic generation (SHG) of laser light is a very mature capability, and SHG has been used for many decades, in commercial, military, and space applications. Efficient SHG requires phase matching of the pump and SH beams, which means that momentum is conserved between the interacting waves and the nonlinear (NL) crystal that produces the SHG phenomenon. Phase matching techniques are also mature for a single pair of pump and SH wavelengths. Generally only one frequency conversion process is phase-matched at a time, and hence, only one single SH wavelength is generated.

SUMMARY

This disclosure provides a system and method for generating multiple simultaneous, co-propagating wavelengths via nonlinear wavelength conversion.

In a first embodiment, a system includes a waveform generator configured to generate a pulsed laser beam at a first wavelength. The system also includes at least one splitter configured to split the laser beam into multiple beams at the first wavelength. The system also includes at least one wavelength shifter configured to shift at least one of the multiple beams to another wavelength. The system also includes at least one combiner configured to combine the multiple beams into a multi-wavelength beam in which multiple wavelengths are co-aligned and propagating parallel to each other. The system also includes at least one nonlinear crystal configured to receive the multi-wavelength beam and generate multiple co-propagating beams using nonlinear wavelength conversion.

In a second embodiment, a method includes generating, at a waveform generator, a pulsed laser beam at a first wavelength. The method also includes splitting, using at least one splitter, the laser beam into multiple beams at the first wavelength. The method also includes shifting, using at least one wavelength shifter, at least one of the multiple beams to another wavelength. The method also includes combining, using at least one combiner, the multiple beams into a multi-wavelength beam in which multiple wavelengths are co-aligned and propagating parallel to each other. The method also includes receiving, using at least one nonlinear crystal, the multi-wavelength beam and generating multiple co-propagating beams using nonlinear wavelength conversion.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures described below and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity, and is not meant to imply that the feature or component cannot be employed in the embodiments described in connection with that figure.

It will be understood that embodiments of this disclosure may include any one, more than one, or all of the features described here. Also, embodiments of this disclosure may additionally or alternatively include other features not listed here. While the disclosed embodiments may be described with respect to laser systems in military applications, these embodiments are also applicable in any other suitable systems or applications.

As discussed above, second harmonic generation (SHG) of laser light is a very mature capability, and SHG has been used for many decades, in commercial, military, and space applications. Efficient SHG requires phase matching of the pump and SH beams, which means that momentum is conserved between the interacting waves and the nonlinear (NL) crystal that produces the SHG phenomenon. Phase matching techniques are also mature for a single pair of pump and SH wavelengths. Generally only one frequency conversion process is phase-matched at a time, and hence, only one single SH wavelength is generated.

The embodiments described in this disclosure provide an architecture in which SHG can be achieved with several input pump beams, either singly (i.e. one-at-a-time), or simultaneously, with the multiple SH output beams being combined to form a single multi-wavelength beam in which all of the individual beams share a common spatial and angular co-alignment.

Existing approaches for generating multiple wavelengths using SHG include an architecture that combines multiple SHG modules, each of which operates with a single pump beam, at a specific wavelength, and generates a single SH beam at a specific SH wavelength. From an application perspective, this approach suffers from two primary disadvantages. First, its size and complexity scales linearly with the number of beams, and this can have a major negative impact on the size, weight, power, cost (SWaP/C), and reliability of the final SHG laser source. Second, this approach also requires an efficient, compact scheme whereby the multiple SH beams can be combined to form a single output beam. This requirement is often difficult to achieve.

Figure 1:
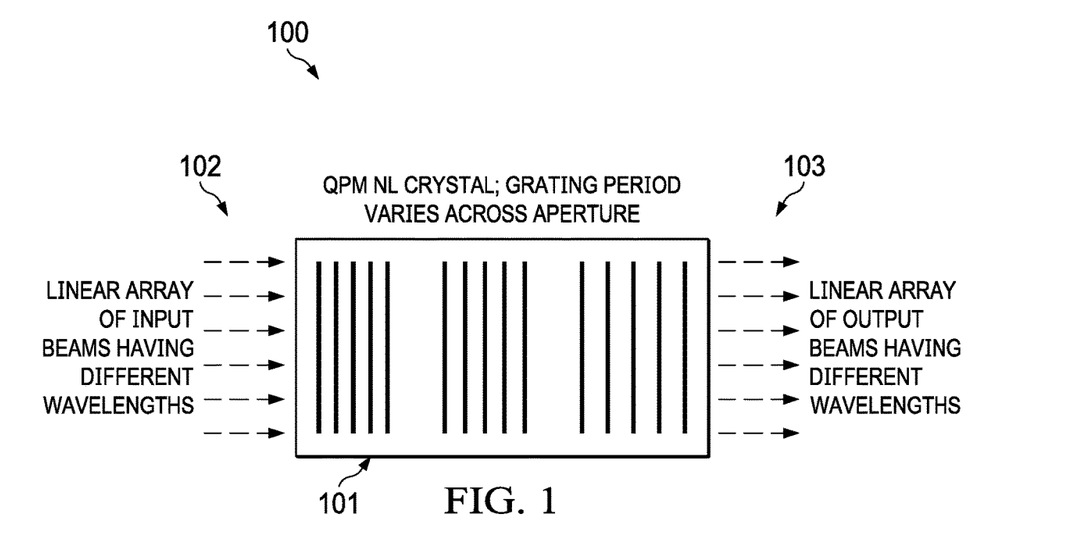
FIG. 1 illustrates a conventional structure for multi-beam second harmonic generation (SHG)

FIG. 1 illustrates a conventional structure 100 for multi-beam SHG. As shown in FIG. 1, the structure 100 includes a NL crystal 101 that incorporates quasi-phase-matching (QPM). In the present case, the QPM grating period, and hence the pump and SH wavelengths, is designed to vary linearly across the entrance aperture (from the bottom to the top in the figure) of the NL crystal 101. In this approach, an array of pump beams 102 enters the NL crystal 101, with a variation of the pump wavelengths across the pump-beam array matching the variation of the QPM-grating phase-matching wavelength across the aperture, such that each of the input beams 102 is phase matched for SHG. An array of output beams 103 that have different wavelengths is generated by the NL crystal 101. The structure 100 suffers from a need for high precision in both spatially and spectrally aligning the multiple pump beams 102 relative to the NL crystal 101, and also specifically ensuring that the spatial wavelength variation of the pump beams 102 matches the spectral variation of the QPM wavelength of the NL crystal 101 to within the allowable tolerances of the QPM gratings. More significantly, the structure 100 does not address, by itself, the challenge of combining the multiple SH output wavelengths into a single output beam.

Another approach for multi-wavelength SHG exploits the fact that in some cases a single NL crystal can be birefringently phase matched for several wavelengths, provided the pump beams have specific polarization and propagation angles within the NL crystal to phase match their respective wavelengths. In some examples using Type II phase matching, the phase-matched wavelength varies from 1080 nm to 1120 nm, yielding SH wavelengths varying from 540 nm to 560 nm, for a total range 20 nm, as the angle of incidence on the NL crystal varies by about 30 degrees, for a crystal temperature of 60 degrees C. To meet the objective defined above, this approach also requires three SH output beams to be spectrally combined, with the same challenges as described in connection with the structure 100 of FIG. 1. This multi-wavelength SHG approach reduces the required number of NL crystals by a factor of three, with further reductions being potentially possible for a wider range of incidence angles on the NL crystal. But the approach still requires the implementation of spectral beam combining (SBC) with a grating to produce a single output beam.

From a practical perspective, several other details of this approach aggravate the beam-combining challenge. Due to manufacturing and alignment tolerances, it is likely that some fine tuning of the specific pump wavelengths and/or propagation angles might have to be applied in order to optimize the SHG efficiency. For example, it might be possible to tune the crystal temperature to optimize SHG efficiency for one pump wavelength, but one or both of the other two remaining wavelengths, and/or their propagation directions, might have to be carefully tuned to optimize the SHG efficiency. However, changing either the angle or wavelength will necessitate the fine tuning of the SBC geometry, which complicates the SBC function. Furthermore, even if the overall operation can be optimized under specific conditions (i.e., temperature, mechanical-alignment precision, etc.), it is possible that during the operational life, those conditions might vary to the point that the optimized performance is no longer achieved. In other words, it is highly preferable to minimize the complexity and number of fine-tuning degrees of freedom in the laser hardware.

The preceding discussion has focused on the SHG portion of the system. Of course, it is preferable that the objectives of reduced parts count and complexity also include some type of multi-functional pump lasers. Specifically, rather than having a single pump laser for each SH output wavelength, the total number of pump lasers can be reduced to the extent that any individual pump laser can be adapted to produce multiple pump beams. In the present context, multiple approaches that meet such a requirement can be considered. First, a variety of laser types can be wavelength-tuned. For example, semiconductor diode lasers can be tuned by means of the drive current, temperature, or by incorporating the diode gain medium within an external resonator, and tuning the resonator wavelength. This approach can be applied to both pulsed and CW lasers. Second, a laser generating a fixed wavelength can be used to drive a NL wavelength conversion technique. In addition to wavelength conversion via SHG (which was discussed above), an existing wavelength can be changed in discrete steps by means of stimulated Raman scattering in any of a variety of materials, including solids, liquids, and gases. Embodiments incorporating one, some, or all of these approaches will now be described.

Figure 2:
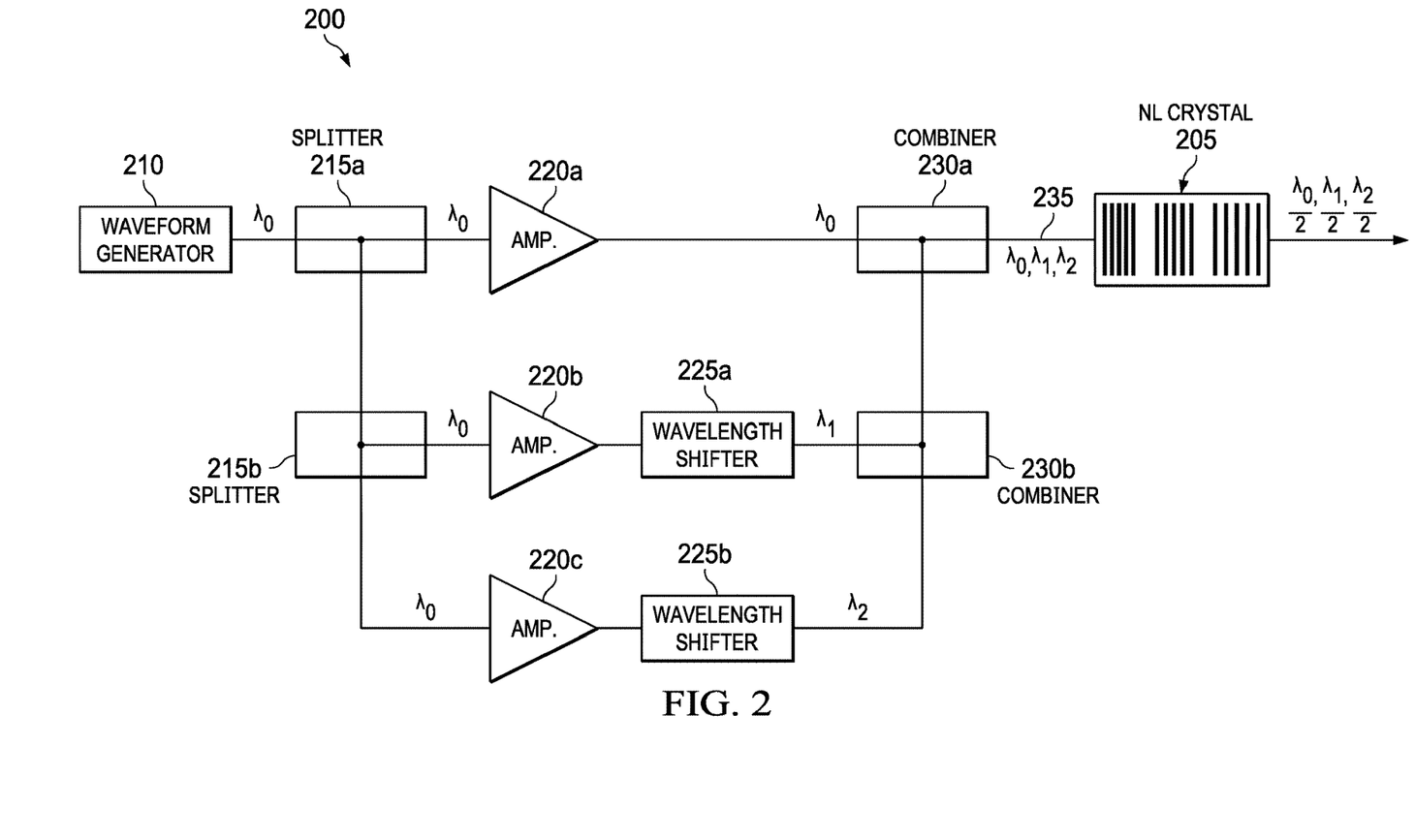
FIG. 2 illustrates an example system for generating multiple simultaneous, co-propagating wavelengths according to this disclosure.

FIG. 2 illustrates an example system 200 for generating multiple simultaneous, co-propagating wavelengths according to this disclosure. As shown in FIG. 2, the system 200 includes a single NL crystal 205 that contains multiple (e.g., three) QPM gratings arranged in series to generate multiple, co-aligned, co-propagating SHG beams. Each QPM section is optimized for a single pump wavelength, and passively transmits the alternative wavelengths. The crystal temperature is tuned to optimize one primary pump wavelength, and the other two wavelengths are fine-tuned relative to their nominal spectral shifts relative to this primary wavelength to optimize the SHG efficiency in their respective QPM waveguides as well. The three wavelengths can be operated singly, or two or three wavelengths could be operated simultaneously.

The system 200 also includes a single pump-pulsed fiber laser waveform generator 210 operating at a wavelength $\lambda_0$, which provides the input beam to the system 200. The beam from the waveform generator 210 is split by two fiber-based splitters 215a-215b to produce two additional fiber-based beams at the wavelength $\lambda_0$. Fiber amplifiers 220a-220c receive the beams and boost the power level of each beam. Wavelength shifters 225a-225b shift the wavelength of two of the beams. Specifically, the wavelength shifter 225a produces a single Stokes (S1) shift to a wavelength $\lambda_1$, while the wavelength shifter 225b produces a second Stokes (S2) shift to a wavelength $\lambda_2$. In some embodiments, the wavelength shifters 225a-225b generate the wavelength shifts using stimulated Raman scattering (SRS) in an optical fiber. Specifically, a fiber Raman medium comprised in each wavelength shifter 225a-225b contains two fiber Bragg gratings (FBGs) to enable the fiber Raman medium contained between the FBGs to function as a Raman resonator, which shifts the initial wavelength to a longer wavelength. Fiber based combiners 230a-230b combine the three beams into a triple-wavelength beam in a single fiber 235, and the triple-wavelength beam is focused into the triple-QPM NL crystal 205. Each pump wavelength is matched to its respective QPM grating, thereby producing a unique SH wavelength from each pump wavelength.

As indicated above, the waveform generator 210 generates a pulsed waveform at a wavelength $\lambda_0$. The pulsed waveform is specified such that each pulse has adequate power to achieve efficient SHG, and the pump switches from one pump wavelength to other wavelengths on a pulse-to-pulse basis. (Of course, this is merely one example, and other temporal patterns are also within the scope of this disclosure.) For fused-silica fibers, and assuming the fiber pump laser operates at $\lambda_0$=1040 nm, the system 200 yields nominal SH output wavelengths of 520 nm, 545 nm, and 571 nm. The system has the flexibility to be designed to produce a longer or shorter set of wavelengths by tuning the initial pump wavelength $\lambda_0$ longer or shorter, and choosing the set of QPM gratings to phase match the new set of SHG processes.

Operation of the system 200 in a pulsed regime (e.g. >100 kHz) enables a single primary fiber laser to exercise broad flexibility in how the pulses from the single laser are shared among three pump wavelengths. For example, the sharing could involve the waveform generator 210 generating bursts of pulses at one wavelength before changing to another wavelength, or the wavelength switching could occur on a pulse-to-pulse basis. Dividing the primary laser signal prior to the laser signal passing through the fiber amplifiers 220a-220c enables each fiber amplifier 220a-220c (which might actually incorporate several amplification stages) to provide the power level appropriate for that wavelength. For example, since the primary pump laser of the waveform generator 210 directly pumps the NL crystal 205, its power level is based on what is necessary to achieve the desired SHG efficiency. The power levels for the other two wavelengths $\lambda_1$ and $\lambda_2$ initially exceed that of the primary laser, in order to compensate for the efficiency loss that necessarily accompanies the Raman wavelength shifting at the wavelength shifters 225a-225b, and still achieve the same power level as for the primary beam at the entrance to the NL crystal 205. Fiber lasers are the preferred approach for this primary laser function for a number of practical reasons, including low cost, high efficiency, good beam quality, robust all-glass architecture free of any free-space optics, and mature materials and fabrication processes, which enable rapid qualification for military and space environments.

In some embodiments, the waveform generator 210 operates the primary pump laser with a "top-hat" pulse temporal profile, having steep rise and fall times, and an essentially constant power level during the pulse. Such pulse shapes can be readily generated with fiber lasers, and such a pulse shape offers important performance benefits by improving the performance of both nonlinear steps—the Raman conversion and SHG.

The wavelength shifters 225a-225b can be selected to operate reliably with good performance. In order to generate Raman wavelength conversion that can be seeded by spontaneous Raman scattering (as opposed to requiring a separate Raman seed beam), it is necessary to have an intensity-length product inside the Raman medium such that the parameter M=gIL=25, where g is the Raman gain coefficient of the specified Raman medium, and I and L are the intensity and length, respectively, of the pump beam in the Raman medium. This ability of the wavelength shifters 225a-225b to initiate the Raman wavelength conversion by spontaneous Raman scattering is advantageous in the system 200, due to the focus on low complexity and parts count. Carrying this idea further, this threshold criterion can be reduced to a much lower value for M=~1 by adding reflectors to each end of the Raman medium, thereby forming a Raman resonator. It can be shown that efficient Raman-resonator operation is possible with one reflector having a reflectivity of unity, and the output coupling reflector having a reflectivity in the range of 40% to 60%. Higher reflectivity values seem attractive for further reducing the required threshold M value. But raising the reflectivity much beyond the range mentioned above may increase the intra-resonator power for a given output power, thereby increasing the probability of optical damage.

As discussed previously, two Raman wavelength shifters 225a-225b are used in the system 200. The wavelength shifter 225a achieves a single Stokes (S1) shift of its output wavelength, and the wavelength shifter 225b achieves two Stokes shifts (S2). It is noted that different approaches can be used for generating a Raman S2 wavelength shift. One obvious approach is to employ a series combination of two S1 Raman resonators, where the first Raman-shifted beam, having a S1 shift relative to the pump wavelength, functions as a pump beam for the second Raman resonator and promotes the generation of an S2 output beam that is two Stokes shifts down from the original pump wavelength. However, this cascade approach results in compounded Raman conversion efficiency losses from the two Raman resonators in series. Hence, if a S1 laser can achieve 60% optical efficiency, the combination mentioned above will achieve approximately 36% (60%×60%=36%) optical efficiency. In addition, this approach can require twice as many components as the S1 Raman converter.

Another approach for second (and higher-order) Stokes shifts is to employ a technique for accomplishing two Stokes shifts within a single Raman resonator. This is accomplished by specifying an output reflector such that the S1 intensity within the resonator reaches the point that it begins to function as a pump to produce the S2 output wavelength. The output reflector is specified to have the reflectivity at the S2 wavelength to optimize that output wavelength. These S2 resonators achieve about the same quantum efficiency as a S1 resonator, although the power efficiency is somewhat lower, due to the doubled quantum-defect loss corresponding to two Stokes shifts. In some embodiments, the design of the system 200 includes this type of second-Stokes resonator.

Another Raman laser design parameter is the fiber length. It is tempting to make the length long, perhaps many meters, to reduce the intensity required to reach the threshold condition. However, it can be shown that, for the Raman resonator to have its greatest functional benefit, the pump pulse length must be sufficiently long that it allows approximately twenty or more round trips of the optical beams within the Raman resonator. For this reason, increasing the fiber length necessitates an increased pulse length and reduced intensity, for a given pump power, for an M value that is essentially unchanged. Therefore, the independently adjustable parameters in a fiber-based Raman resonator are the pump pulse energy and the mode area. A complete accounting for all of the relevant parameters can lead to a workable range of pulse energies and mode areas. For example, an 80 cm length of fused silica fiber having a mode diameter of 10 μm (mode area of 80 μm$^2$) can generate efficient Raman conversion with a 40 μJ, 40 nsec pulse (peak power of 1 kW). For a pulse repetition frequency of 100 kHz, this would correspond to an average pump power of 4 W, and an estimated Raman-shifted power of about 2.5 W or more.

As mentioned above, the wavelengths $\lambda_2$ and $\lambda_3$ may require fine tuning to maximize the SH efficiency, depending on the precise periods of the second and third QPM gratings in the NL crystal 205. In some embodiments, the system 200 provides for a straightforward approach for accomplishing this wavelength tuning. In some embodiments, the wavelength shifters 225a-225b comprise Raman-resonator reflectors that comprise fiber Bragg gratings (FBGs), which are commercially available for splicing onto fibers. FBGs are fabricated using a process in which a UV laser is used to induce a periodic longitudinal variation of the refractive index of the fused silica material. A primary feature of FBGs is that the reflectivity function that is essential for the function of a resonator is accomplished directly in the fiber core, without the need for any free-space optics and the associated alignment procedures. Furthermore, FBGs can be tuned by applying an appropriate stress to the FBG by means of a piezo-electric actuator. This approach can be used in the system 200 to implement any fine wavelength tuning to optimize the efficiency of the second and third QPM gratings.

It is possible to estimate the tuning range that can be achieved by a fused-silica Raman resonator. The Stokes shift in fused silica is about 430 $cm^{-1}$. The full width at half maximum (FWHM) of the Raman gain curve is about 50% of the Raman shift, and in operation it will be gain-narrowed by a factor of five to about 10%, and the half width at half maximum (HWHM) will be about 5%. At a typical pump wavelength of 1040 nm, the Raman shift is about 50 nm, so by changing the Raman resonator length with a fixed pump wavelength, the Stokes wavelength can be tuned by about 5% of 50 nm, or about 2.5 nm (HWHM). This corresponds to about 0.25% of the Stokes wavelength. Assuming a typical QPM period of ~6.5 μm, it is estimated that an error in the QPM period of 10 nm would translate the optimum phase-matched pump wavelength by ~0.5 nm. Hence, the estimated 2.5 nm tuning range of the Raman resonators will accommodate an error in the QPM period of ~50 nm, or about 7% of the period. Given the photolithographic techniques employed in fabricating state-of-the-art QPM NL crystals, it is believed that the Raman tuning range is adequate for the present tolerances. If additional tuning is required, thermal tuning can also be employed, which is slower, but has a greater tuning range.

Figure 3:
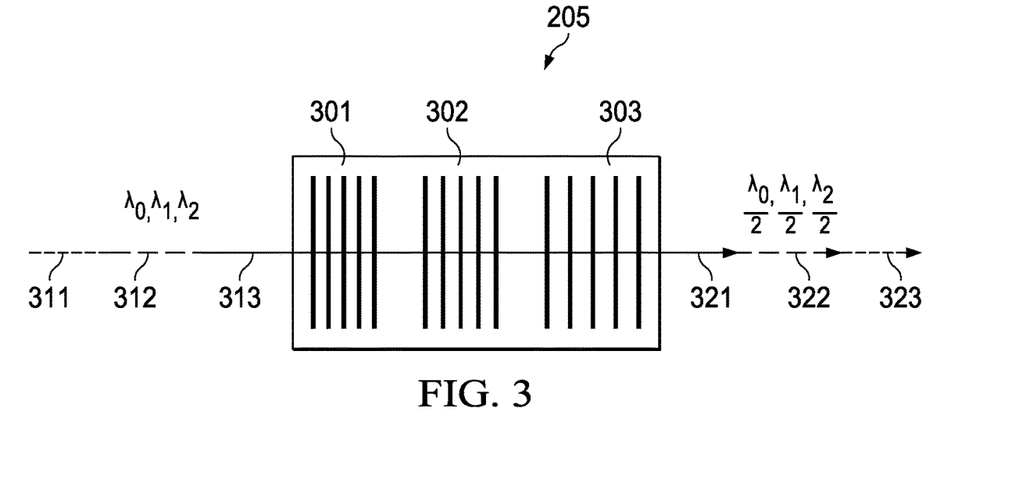
FIG. 3 illustrates an example of the nonlinear crystal shown in FIG. 2 according to this disclosure.

FIG. 3 illustrates an example of the NL crystal 205 of FIG. 2 according to this disclosure. As shown in FIG. 3, the NL crystal 205 includes three QPM gratings 301-303, where each grating is selected to correspond to one of the wavelengths $\lambda_0$, $\lambda_1$, and $\lambda_2$. Each grating 301-303 generates the harmonic of its corresponding pump wavelength, while having negligible interaction with the other wavelengths present due to the choice of large phase mismatch for these interactions. Beam propagation is maintained throughout the NL crystal 205. That is, three co-propagating beams 311-313 are input to the NL crystal 205, and three co-propagating beams 321-323 are output from the NL crystal 205.

In some embodiments, a significant fraction of the input energy is converted from the fundamental frequency to the second harmonic frequency, with a typical objective being >50% energy conversion. For operation of the frequency converter in a depleted-pump regime, it is advantageous to have a design that avoids back conversion (i.e., power flow from the harmonic frequency back to the fundamental frequency), while maintaining some reasonable tolerance to phase mismatch and margin for photorefractive damage. The system 200 employs high conversion efficiency for three different SHG processes in a single NL crystal 205. This limits the length of each QPM grating 301-303 to at most one third of the longest available crystal length. The peak intensity of each input can be chosen to achieve a material-dependent value for the product of intensity with the squared length of the corresponding QPM grating 301-303. However, the peak intensity may be limited by processes such as photorefractive damage in lithium niobate and lithium tantalite (approximately 3 $MW/cm^2$), or gray tracking in $KTiOPO_4$ (KTP).

The disclosed embodiments show that, for multi-watt level inputs, and with some freedom to choose the waveform, high SHG conversion efficiency in periodically poled lithium niobate can be achieved in a 20 mm long QPM grating, with a peak intensity well below the photorefractive-damage threshold. It is possible to fit three different QPM gratings on a single lithium niobate chip. The heat load at a notional level of 4 W per beam, or a total pump power of 12 W, is tolerable, i.e., within the temperature phase-matching bandwidth.

Although FIGS. 2 and 3 illustrate one example of a system 200 for generating multiple simultaneous, co-propagating wavelengths, various changes may be made to FIGS. 2 and 3. For example, while the system 200 includes a single NL crystal 205 with three QPM gratings 301-303, other embodiments could include different numbers of NL crystals and/or different numbers of QPM gratings. As a particular example, the system 200 could include two or more NL crystals arranged together and the three QPM gratings could be distributed across the two or more NL crystals. In such an example, a first NL crystal could have one of the QPM gratings, while a second NL crystal could have the other two QPM gratings. As another example, while the system 200 generates multiple co-propagating beams using SHG, other embodiments could use a different nonlinear wavelength conversion process. In general, the makeup and arrangement of the system 200 are for illustration only. Components could be added, omitted, combined, or placed in any other configuration according to particular needs.

The embodiments disclosed above can generate a sequence of output wavelengths, with the wavelength spacing being determined by the Stokes shift of the fiber medium. In some applications, it may be helpful or necessary to use a smaller spectral spacing between adjacent output wavelengths. This can be accomplished using variations of the basic architecture. For example, rather than using a fused-silica fiber as the Raman medium, it is possible to use a bulk medium having a larger or smaller Stokes shift. For example, crystalline quartz has a Stokes shift as small as 128 $cm^{-1}$, while potassium-gadolinium-tungstate (KGW) crystals have two Stokes shifts of 768 and 904 $cm^{-1}$.

In some embodiments, two or more laser modules having different primary wavelengths can be employed, either to broaden the total wavelength coverage, or to reduce the spectral spacing between adjacent wavelengths without having to depart from the fiber-based Raman medium. In one embodiment, the system of FIG. 2 could be used as a building block, and the output of two or more blocks could be combined to form a single beam output with six or more wavelengths. For example, in a system with two building blocks having output beams that are orthogonally polarized, the two beams could be combined on an element that reflects s-polarized light and transmits p-polarized light. Alternatively, if one building block outputs three wavelengths that are all shorter in wavelength than another building block, the two blocks could be combined on a dichroic mirror that reflects one set of wavelengths and transmits the other set of wavelengths to produce a single beam output with six wavelengths. Also, some combination of the two systems just described could produce a single beam output with more than six wavelengths.

Figure 4:
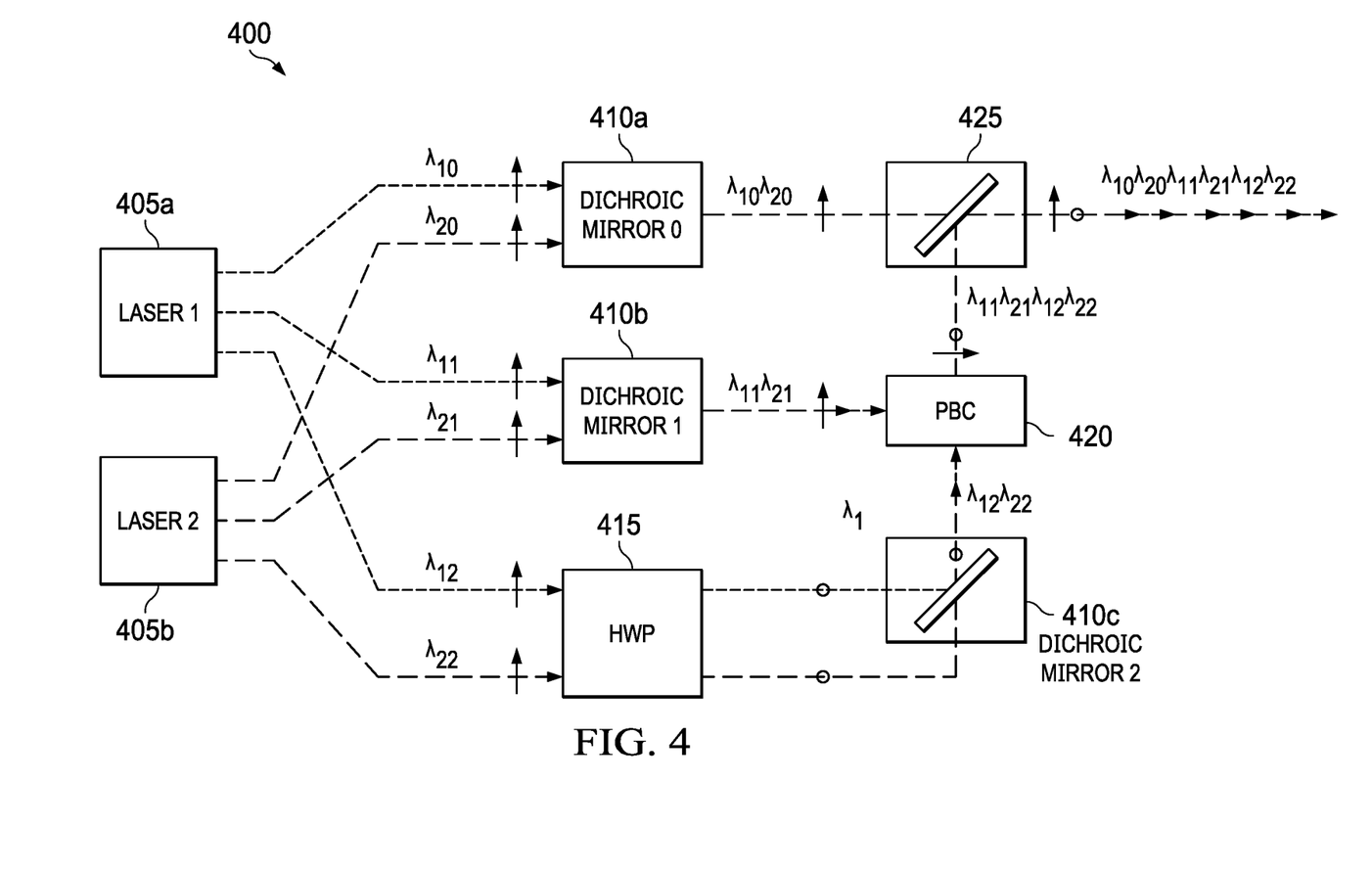
FIG. 4 illustrates a system for generating multiple simultaneous, co-propagating wavelengths using multiple lasers, according to this disclosure.

FIG. 4 illustrates a system 400 for generating multiple simultaneous, co-propagating wavelengths using multiple lasers, according to this disclosure. The system 400 generates six co-aligned laser beams from two three-wavelength laser modules using only optical components with relatively relaxed alignment and spectral precision.

As shown in FIG. 4, the system 400 includes two three-wavelength laser modules 405a-405b. The output from each of the two laser modules 405a-405b includes three wavelengths, for a total of six wavelengths $\lambda_{10}$, $\lambda_{11}$, and $\lambda_{12}$ from one laser module 405a, and $\lambda_{20}$, $\lambda_{21}$, and $\lambda_{22}$ from the other laser module 405b. The system 400 also includes multiple components that are the same as or similar to those shown in the system 200 of FIG. 2. For example, to generate the three wavelengths, each laser module 405a-405b may comprise a combination of multiple components (e.g., waveform generators, splitters, amplifiers, shifters, and the like) such as those in the system 200. However, for the sake of simplicity and clarity, those components are not explicitly shown in FIG. 4.

Each wavelength $\lambda_{10}$, $\lambda_{11}$, $\lambda_{12}$, $\lambda_{20}$, $\lambda_{21}$, and $\lambda_{22}$ is indicated using two subscripts. The first subscript indicates which laser module 405a-405b generated the wavelength, and the second subscript indicates the number of Stokes shifts (0, 1, or 2). The wavelengths of each laser 405a-405b can be selected according to the particular requirements of the system 400. In some embodiments, the primary wavelength of the laser module 405a is 1040 nm, in which case the SH wavelengths are 520 nm, 545 nm, and 570 nm. In some embodiments, the primary wavelength of the laser module 405b is 1060 nm, and the associated SH wavelengths are 530 nm, 555 nm, and 583 nm. This results in an average spectral spacing of about 10 to 15 nm for the combined six wavelengths. The arrows and dots shown in FIG. 4 represent polarization states. To simplify the present discussion, it is assumed that all SH beams of both laser modules 405a-405b are initially polarized parallel to one another, and in the plane of the diagram.

Note that while each of the two laser modules 405a-405b produces three wavelengths that are precisely co-aligned, some type of spectral combining can be implemented to ensure that all six wavelengths identified in the above example can also be co-aligned. This could be accomplished using spectral beam combining with a grating. However, as explained above, it can be preferable to avoid the concomitant requirements for high-precision spectral, spatial, and angular alignment among the beams to be combined. However, given the relatively large spectral intervals and the low total number of beams, a combination of polarization combining with a single dichroic edge-filter could combine the six beams into a single beam.

To accomplish this objective, the system 400 pairs up beams that are close in wavelength, i.e., $\lambda_{1i}$ and $\lambda_{2i}$, for i=0, 1, and 2. This pairing simplifies the combining functions for the respective beam pairs. The total spectral spread within a given pair is relatively small, ~10 to 15 nm, so as to distinguish them spectrally from the remaining wavelengths covering a total spread of 63 nm in the example noted above, and yet not so small as to preclude efficient combining of the two beams that comprise each pair.

In order to produce the three wavelength pairs, the system 400 includes three dichroic mirrors 410a-410c. For simplicity of the drawing, schematic details are shown only for the dichroic mirror 410c. The functionality of the system 400 may best be described beginning with the beams $\lambda_{12}$, $\lambda_{22}$ at the bottom. Before the beams $\lambda_{12}$, $\lambda_{22}$ are combined, they pass through a half-wave plate (HWP) 415, which rotates the polarization of those beams $\lambda_{12}$, $\lambda_{22}$ so that they can be simply combined with the beams $\lambda_{11}$, $\lambda_{21}$ at a polarization beam combiner (PBC) 420. This is a very straightforward method that is essentially independent of wavelength in the wavelength range of interest. The final combining step is accomplished with a dichroic edge reflector 425, which transmits the shortest two wavelengths $\lambda_{10}$, $\lambda_{20}$, and reflects all of the remaining longer-wavelength beams $\lambda_{11}$, $\lambda_{12}$, $\lambda_{21}$, and $\lambda_{22}$. The resulting output from the dichroic edge reflector 425 is the six co-propagating beams at the six wavelengths $\lambda_{10}$, $\lambda_{12}$, $\lambda_{20}$, $\lambda_{21}$, and $\lambda_{22}$. The co-propagating beams are then input into a NL crystal for SHG, such as shown in FIG. 2. In this embodiment, the NL crystal would include six gratings.

Throughout the architecture, as is the case for any combining of six beams, each beam requires precise mechanical alignment of its propagation direction so that all beams co-propagate after being combined. The system 400 provides the benefit that the alignments of the three dichroic mirrors 410a-410c and the dichroic edge reflector 425 are essentially independent of each other, unlike beam combining at a grating, where tilting the grating to improve the combining efficiency of one pair of beams can simultaneously degrade the combining efficiency of the remaining beams.

It is noted that the disclosed embodiments have been described in the context of utilizing SHG to generate multiple wavelengths in the green spectral range. However, the concepts and principles disclosed herein can be used for other spectral ranges. These concepts and principles can also be used with other nonlinear wavelength conversion applications based on second-order, nonlinear processes that can be phase-matched using QPM. Some examples include sum- and difference-frequency generation, and also optical parametric generation to produce co-propagating beams at multiple output wavelengths generated by the desired NL process.

The embodiments disclosed herein provide multiple advantageous benefits over conventional approaches. One benefit is that all three fundamental and SHG wavelengths are automatically co-aligned into a single output beam regardless of their precise wavelengths, so that the cost and complexity of the spectral combining of the SHG beams in a grating can be avoided. Other benefits include the following:

All pump beams are derived from a single fiber laser, and this laser ultimately leads to the generation of multiple (e.g., three) output SH wavelengths.

The Raman wavelength conversions are all accomplished within fibers.

The all-glass fiber architecture ensures a simple, low-SWaP architecture free of any free-space optics, even in the generation of the two Raman wavelengths, thereby ensuring robust long-life operation.

Depending on the peak-power requirement, the disclosed embodiments can operate with single-mode fibers, thereby avoiding the complexity associated with large mode area (LMA) fibers.

In some embodiments (e.g. FIG. 4), an additional three (or six) wavelengths can be generated, starting with a different pump wavelength(s), yielding three (or six) more wavelengths, which can broaden the total wavelength coverage, or fill the wavelength gaps of the first triplet of output wavelengths.

Figure 5:
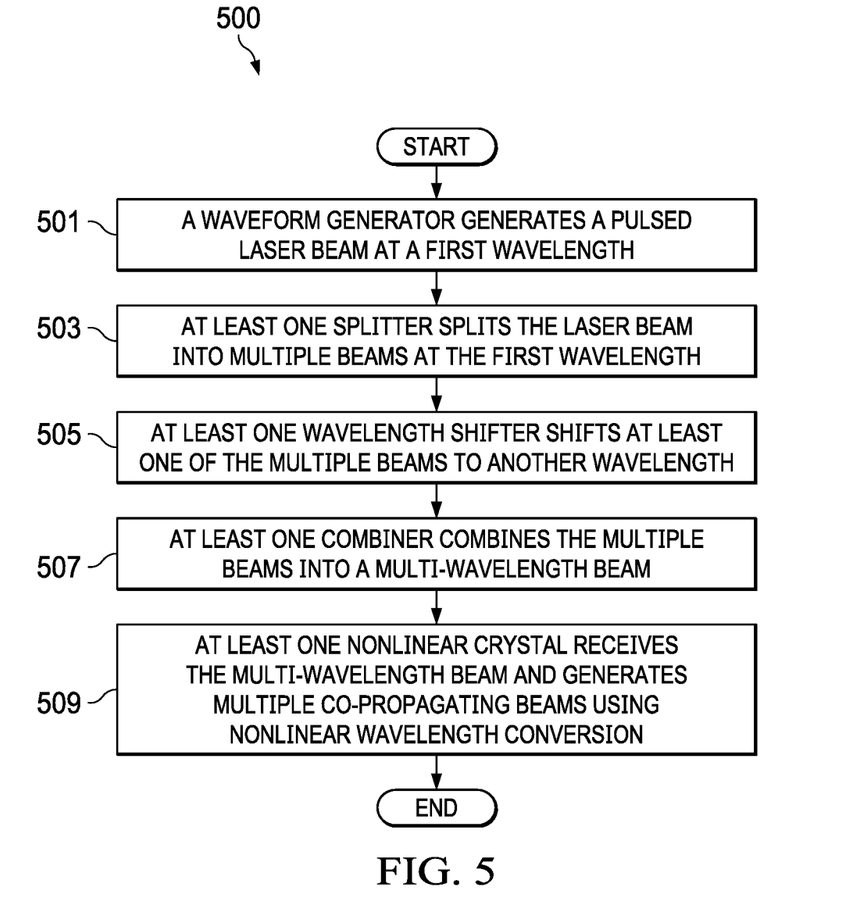
FIG. 5 illustrates an example method for generating multiple simultaneous, co-propagating wavelengths according to this disclosure.

FIG. 5 illustrates an example method 500 for generating multiple simultaneous, co-propagating wavelengths according to this disclosure. For ease of explanation, the method 500 is described as being performed using the system 200 of FIG. 2 or the system 400 of FIG. 4. However, the method 500 could be used with any other suitable device or system.

At step 501, a waveform generator generates a pulsed laser beam at a first wavelength. This may include, for example, the waveform generator 210 generating the pulsed laser beam at a wavelength $\lambda_0$.

At step 503, at least one splitter splits the laser beam into multiple beams at the first wavelength. This may include, for example, the fiber-based splitters 215a-215b splitting the laser beam into first, second, and third beams at the wavelength $\lambda_0$.

At step 505, at least one wavelength shifter shifts at least one of the multiple beams to another wavelength. This may include, for example, the wavelength shifters 225a-225b shifting the wavelength of two of the beams. In particular, the wavelength shifter 225a may produce a single Stokes (S1) shift to a wavelength $\lambda_1$, and the wavelength shifter 225b may produce a two Stokes (S2) shift to a wavelength $\lambda_2$.

At step 507, at least one combiner combines the multiple beams into a multi-wavelength beam in which multiple wavelengths are co-aligned and propagating parallel to each other. In some embodiments, the multi-wavelength beam is propagated in a single fiber. This may include, for example, the fiber-based combiners 230a-230b combining the three beams into a triple-wavelength beam in a single fiber 235.

At step 509, at least one NL crystal receives the multi-wavelength beam and generates multiple co-propagating beams using nonlinear wavelength conversion. This may include the NL crystal 205 receiving the triple-wavelength beam and generating three co-propagating beams at SH wavelengths. In some embodiments, the at least one NL crystal may include two or more NL crystals.

Although FIG. 5 illustrates one example of a method 500 for generating multiple simultaneous, co-propagating wavelengths, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a waveform generator configured to generate a pulsed laser beam at a first wavelength;
   at least one splitter configured to split the pulsed laser beam into multiple beams at the first wavelength, the multiple beams comprising first, second, and third beams;
   a first wavelength shifter configured to employ stimulated Raman scattering and to shift the second beam by one Stokes shift to a second wavelength;
   a second wavelength shifter configured to employ stimulated Raman scattering and to shift the third beam by two Stokes shifts to a third wavelength;
   at least one combiner configured to combine the multiple beams into a multi-wavelength beam in which the first, second, and third wavelengths are co-aligned and propagating parallel to each other; and
   at least one nonlinear crystal configured to receive the multi-wavelength beam and generate multiple co-propagating beams using nonlinear wavelength conversion.

2. The system of claim 1, wherein the multi-wavelength beam propagates within a single fiber.

3. The system of claim 1, wherein the nonlinear wavelength conversion comprises second harmonic generation.

4. The system of claim 1, wherein the at least one splitter comprises two splitters configured to split the pulsed laser beam into at least the first, second, and third beams at the first wavelength.

5. The system of claim 1, wherein the at least one combiner comprises:
   a first combiner configured to combine the third beam at the third wavelength and the second beam at the second wavelength; and
   a second combiner configured to combine the first beam at the first wavelength and the combined second and third beams such that the first, second, and third beams spatially overlap and are co-aligned in their propagation direction.

6. The system of claim 5, wherein the second combiner is configured to combine the first beam at the first wavelength and the combined second and third beams such that the first, second, and third beams form the multi-wavelength beam.

7. The system of claim 5, wherein the at least one nonlinear crystal comprises three quasi-phase-matched (QPM) gratings arranged in series, each of the QPM gratings configured to generate a second harmonic wavelength of a corresponding one of the first, second, and third beams.

8. The system of claim 7, wherein the at least one nonlinear crystal comprises only one nonlinear crystal that comprises the three QPM gratings.

9. The system of claim 7, wherein the at least one nonlinear crystal comprises two or more nonlinear crystals, and the three QPM gratings are distributed across the two or more nonlinear crystals.

10. The system of claim 1, further comprising at least one amplifier configured to boost a power level of each of the multiple beams.

11. The system of claim 10, wherein the at least one amplifier comprises a fiber amplifier configured to boost the power level of each of the multiple beams.

12. A system comprising:
a first laser module comprising:
    a first waveform generator configured to generate a pulsed laser beam at a first wavelength;
    at least one first splitter configured to split the pulsed laser beam into multiple beams at the first wavelength; and
    at least one first wavelength shifter configured to shift at least one of the multiple beams to at least one other wavelength;
a second laser module comprising a second waveform generator, at least one second splitter, and at least one second wavelength shifter, the first and second laser modules configured to generate at least six beams having at least six wavelengths;
at least one combiner configured to combine the at least six beams into a multi-wavelength beam in which the at least six wavelengths are co-aligned and propagating parallel to each other; and
at least one nonlinear crystal configured to receive the multi-wavelength beam and generate multiple co-propagating beams using nonlinear wavelength conversion.

13. The system of claim 12, further comprising:
multiple dichroic mirrors configured to combine distinct pairs of the at least six beams.

14. The system of claim 12, further comprising:
a half-wave plate configured to rotate a polarization of two beams of the at least six beams; and
a polarization beam combiner configured to combine at least one of the two beams having their polarizations rotated with at least one of the at least six beams other than the two beams having their polarizations rotated.

15. A system comprising:
a waveform generator configured to generate a pulsed laser beam at a first wavelength;
at least one splitter configured to split the pulsed laser beam into multiple beams at the first wavelength;
at least one wavelength shifter configured to shift at least one of the multiple beams to at least one other wavelength;
at least one combiner configured to combine the multiple beams into a multi-wavelength beam in which the wavelengths are co-aligned and propagating parallel to each other; and
at least one nonlinear crystal configured to receive the multi-wavelength beam and generate multiple co-propagating beams using nonlinear wavelength conversion;
wherein the system is configured to generate the multiple co-propagating beams at second harmonic wavelengths without spectral beam combining of the co-propagating beams at a grating.

16. A method comprising:
generating, at a waveform generator, a pulsed laser beam at a first wavelength;
splitting, using at least one splitter, the pulsed laser beam into multiple beams at the first wavelength, the multiple beams comprising first, second, and third beams;
shifting, a first wavelength shifter that employs stimulated Raman scattering, the second beam by one Stokes shift to a second wavelength;
shifting, using a second wavelength shifter that employs stimulated Raman scattering, the third beam by two Stokes shifts to a third wavelength;
combining, using at least one combiner, the multiple beams into a multi-wavelength beam in which the first, second, and third wavelengths are co-aligned and propagating parallel to each other; and
receiving, using at least one nonlinear crystal, the multi-wavelength beam and generating multiple co-propagating beams using nonlinear wavelength conversion.

17. The method of claim 16, wherein the multi-wavelength beam propagates within a single fiber.

18. The method of claim 16, wherein the nonlinear wavelength conversion comprises second harmonic generation.

19. The method of claim 16, wherein splitting the laser beam into the multiple beams at the first wavelength comprises:
splitting, using two splitters, the laser beam into at least the first, second, and third beams at the first wavelength.

20. The method of claim 16, wherein combining the multiple beams into the multi-wavelength beam comprises:
combining, using a first combiner, the third beam at the third wavelength and the second beam at the second wavelength; and
combining, using a second combiner, the first beam at the first wavelength and the combined second and third beams such that the first second and third beams spatially overlap and are co-aligned in their propagation direction.

21. The method of claim 20, wherein combining the first beam at the first wavelength and the combined second and third beams comprises:
combining, using the second combiner, the first beam at the first wavelength and the combined second and third beams such that the first, second, and third beams form the multi-wavelength beam.

22. The method of claim 20, wherein the at least one nonlinear crystal comprises three quasi-phase-matched (QPM) gratings arranged in series, each of the QPM gratings configured to generate a second harmonic wavelength of a corresponding one of the first, second, and third beams.

23. The method of claim 22, wherein the at least one nonlinear crystal comprises only one nonlinear crystal that comprises the three QPM gratings.

24. The method of claim 22, wherein the at least one nonlinear crystal comprises two or more nonlinear crystals, and the three QPM gratings are distributed across the two or more nonlinear crystals.

25. The method of claim 16, further comprising:
boosting, using at least one amplifier, a power level of each of the multiple beams.

26. The method of claim 25, wherein boosting the power level of each of the multiple beams comprises:
boosting, using at least one fiber amplifier, the power level of each of the multiple beams.

27. A method comprising:
generating at least six beams having at least six wavelengths using first and second laser modules, wherein:

the first laser module comprises (i) a first waveform generator that generates a pulsed laser beam at a first wavelength, (ii) at least one first splitter that splits the pulsed laser beam into multiple beams at the first wavelength, and (iii) at least one first wavelength shifter that shifts at least one of the multiple beams to at least one other wavelength; and the second laser module comprises a second waveform generator, at least one second splitter and at least one second wavelength shifter;

combining, using at least one combiner, the at least six beams into a multi-wavelength beam in which the at least six wavelengths are co-aligned and propagating parallel to each other; and receiving, using at least one nonlinear crystal, the multi-wavelength beam and generating multiple co-propagating beams using nonlinear wavelength conversion.

28. The method of claim 27, further comprising:
combining distinct pairs of the at least six beams using multiple dichroic mirrors.

29. The method of claim 27, further comprising:
rotating, using a half-wave plate, a polarization of two beams of the at least six beams; and combining, using a polarization beam combiner, at least one of the two beams having their polarizations rotated with at least one of the at least six beams other than the two beams having their polarizations rotated.

30. A method comprising:

generating, at a waveform generator, a pulsed laser beam at a first wavelength;

splitting, using at least one splitter, the pulsed laser beam into multiple beams at the first wavelength;

shifting, using at least one wavelength shifter, at least one of the multiple beams to at least one other wavelength;

combining, using at least one combiner, the multiple beams into a multi-wavelength beam in which the wavelengths are co-aligned and propagating parallel to each other; and receiving, using at least one nonlinear crystal, the multi-wavelength beam and generating multiple co-propagating beams using nonlinear wavelength conversion;

wherein the multiple co-propagating beams are generated at second harmonic wavelengths without spectral beam combining of the co-propagating beams at a grating.

\* \* \* \* \*